(12) United States Patent
Kinouchi et al.

(10) Patent No.: US 6,349,612 B1
(45) Date of Patent: Feb. 26, 2002

(54) STEERING APPARATUS FOR FOUR-WHEELED VEHICLE

(75) Inventors: Sosuke Kinouchi, Kakogawa; Masatoshi Inoue, Himeji, both of (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 0 days.

(21) Appl. No.: 09/542,881

(22) Filed: Apr. 4, 2000

(30) Foreign Application Priority Data

Oct. 7, 1999 (JP) .......................................... 11-286702

(51) Int. Cl.[7] .............................. B62D 3/12; F16H 55/28
(52) U.S. Cl. ........................ 74/498; 74/89.18; 74/399; 74/409; 280/93.514; 384/192
(58) Field of Search ........................... 74/89.18, 89.19, 74/397, 399, 498, 409; 280/93.513, 93.514, 771; 384/192

(56) References Cited

U.S. PATENT DOCUMENTS

| | | | |
|---|---|---|---|
| 1,232,281 A | * | 7/1917 | Goss ............................ 74/498 |
| 4,441,735 A | * | 4/1984 | Hutchison et al. .......... 280/771 |
| 5,788,276 A | * | 8/1998 | Yamanaka et al. .......... 280/771 |

FOREIGN PATENT DOCUMENTS

| | | |
|---|---|---|
| JP | 52-73373 | 12/1950 |
| JP | 56-141872 | 3/1955 |
| JP | A-4-292224 | 10/1992 |

* cited by examiner

*Primary Examiner*—Allan D. Herrmann
(74) *Attorney, Agent, or Firm*—Oliff & Berridge, PLC

(57) ABSTRACT

A steering apparatus for a four-wheeled vehicle transmits a steering force through a steering shaft, a reduction gear, a steering lever and right and left tie rods to right and left knuckles. The reduction gear includes a pinion gear turned by the steering shaft, a steering gear engaged with the pinion gear and fixedly mounted on a lever shaft, which is combined with the steering lever, and a gear case housing the pinion gear and the steering gear. The lever shaft has a first end portion supported in a bearing held on the gear case. The bearing permits the lever shaft to be turned therein. The lever has a second end portion supported in a bearing hole that permits the second end portion to be shifted in the back-and-forth direction. The second end portion of the lever shaft is biased by a spring so as to press the steering gear against the pinion gear so that no backlash is formed between the pinion gear and the steering gear.

16 Claims, 5 Drawing Sheets

STEERING APPARATUS FOR FOUR-WHEELED VEHICLE

BACKGROUND OF THE INVENTION

1. Field of the Invention

The present invention relates to a steering apparatus for a four-wheeled vehicle. This steering apparatus is used to transmit a steering force applied to a handle, which is connected to a steering shaft, through a reduction gear mechanism, a steering lever and a pair of tie rods to knuckles, which support right and left wheels, respectively.

2. Description of the Related Art

A steering apparatus for a four-wheeled vehicle, particularly, a low-speed utility vehicle is provided with a rack-and-pinion reduction gear mechanism (steering gear mechanism). The rack-and-pinion reduction gear mechanism includes a pinion connected to a steering shaft, and a rack engaged with the pinion and capable of moving to right and left, i.e., in the direction along the width of a vehicle. The opposite ends of the rack are connected to right and left knuckles by tie rods, respectively.

The long rack of the rack-and-pinion reduction gear mechanism is disposed so as to extend and move laterally, and hence the right and left tie rods are inevitably short. In case that such short tie rods are used, the position of the rack with respect to the back-and-forth direction cannot be spaced a long distance apart from the position of the joint of the knuckle and the tie rod. Therefore, the flexibility of the positioning of the rack is strictly restricted.

If the rack is disposed far ahead of the joints of the knuckles and the tie rods with respect to the back-and-forth direction to secure a wide space for driver's feet on a step, the mounting angles of the tie rods become large. As a result, a high steering force is necessary. Thus, the position of the rack along the back-and-forth direction must be in a narrow range to achieve a low steering force by making the mounting angles of the tie rods small. On the other hand, the mounting angles of the tie rods must be large to secure a wide space for driver's feet. As a result, a high steering force is inevitably caused.

Another type of steering apparatus includes a spur gear type reduction gear mechanism with a set of pinion and spur gear instead of rack and pinion. Long tie rods can be used because the spur gear does not need a wide lateral space. Even if the reduction gear mechanism is disposed far ahead of the joints of the knuckles and the tie rods, the mounting angles of the tie rods can be small. As a result, a low steering force can be achieved. This kind of steering apparatus with the spur gear type reduction gear mechanism is disclosed in Japanese Laid-Open Publication No. 292224/1992.

SUMMARY OF THE INVENTION

It is an object of the present invention to provide a steering apparatus with a spur gear type reduction gear mechanism which is capable of eliminating backlash in the reduction gear mechanism by simple constitutions and of giving the driver an improved steering feeling.

According to the present invention, a steering apparatus for a four-wheeled vehicle, comprises: a steering shaft adapted to be rotated by a handle; a reduction gear mechanism operatively connected to the steering shaft; the reduction gear mechanism including a pinion gear, a steering gear engaged with the pinion gear, a gear case in which the pinion gear and the steering gear are housed, and a pinion shaft on which the pinion gear is mounted, the pinion shaft being connected to the steering shaft; a steering lever operatively connected to the reduction gear mechanism; right and left tie rods operatively connected to the steering lever; and right and left knuckles operatively connected to the right and the left tie rods, respectively; a lever shaft on which the steering gear is mounted and being combined with the steering lever, a spring biasing the lever shaft so that the steering shaft is pressed against the pinion gear.

Preferably, the lever shaft has first and second end portions on first and second sides which are located on opposite sides with respect to a position at which the steering gear is connected to the lever shaft, the first end portion being supported by a bearing on the gear case and the second end portion being supported with a radial clearance by a bearing hole formed in the gear case.

Preferably, the clearance between the bearing hole and the lever shaft is formed so as to permit the lever shaft to move only in a direction in which the lever shaft is biased by the spring.

Preferably, the spring is disposed on the second side on which the bearing hole is formed.

Preferably, the spring comprises a compression coil spring and a plunger which is biased forward by the compression coil spring to press the second end portion of the lever shaft forward.

Preferably, the plunger includes a recess which is in close contact with a rear surface of the lever shaft.

Preferably, the plunger includes a V-shaped groove which is in contact with a rear surface of the lever shaft.

Preferably, the plunger includes a flat surface which is in contact with a rear surface of the lever shaft.

Preferably, the spring is disposed on the first side on which the bearing is disposed.

Preferably, the spring comprises a compression coil spring and a plunger which is biased forward by the compression coil spring to press the second end portion of the lever shaft forward.

Preferably, the plunger includes a recess which is in close contact with a rear surface of the lever shaft.

Preferably, the plunger includes a V-shaped groove which is in contact with a rear surface of the lever shaft.

Preferably, the plunger includes a flat surface which is in contact with a rear surface of the lever shaft.

Preferably, the bearing has a convex inner surface on which the lever shaft is supported so that the lever shaft is able to swing back-and-forth.

Preferably, the steering gear is a sector gear of which an axis is aligned with an axis of the lever shaft.

Preferably, the gear case is provided in its front end portion with an upper boss and a bottomed lower boss for supporting the pinion shaft, a lower end portion of the pinion shaft being fitted in a bore formed in the lower boss, and an upper end portion of the pinion shaft being supported in a ball bearing which is fitted in the upper boss.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

Figure 1:
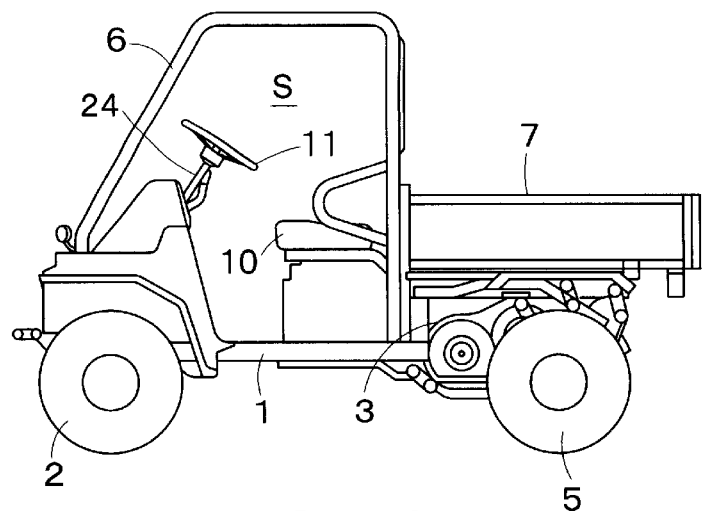
FIG. 1 is a side elevation of four-wheeled vehicle provided with a steering apparatus in a preferred embodiment according to the present invention.

Referring to FIG. 1 showing a utility vehicle provided with a steering apparatus in a preferred embodiment according to the present invention. Right and left wheels 2 are supported in a front portion of a main frame 1. The utility vehicle is a rear-engine vehicle with an engine in a rear portion thereof. A transmission and right and left rear wheels 5 serving as driving wheels. A passenger space S is defined by a cabin frame 6 in a front half portion of the vehicle. A luggage deck 7 is disposed in a rear half portion of the vehicle. A seat 10 is installed in a rear region of the passenger space S and a circular handle 11 is disposed in a front region of the passenger space S.

Figure 2:
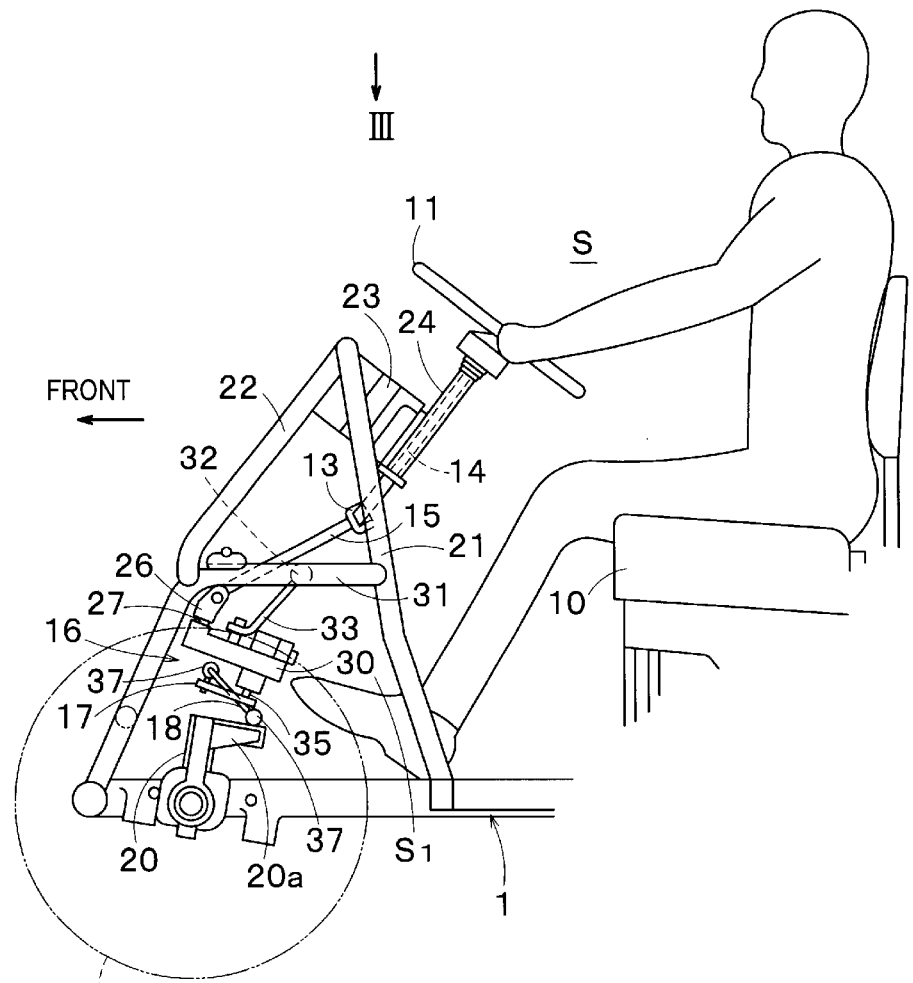
FIG. 2 is a side elevation of an internal structure in a front half of the vehicle shown in FIG. 1.
Figure 3:
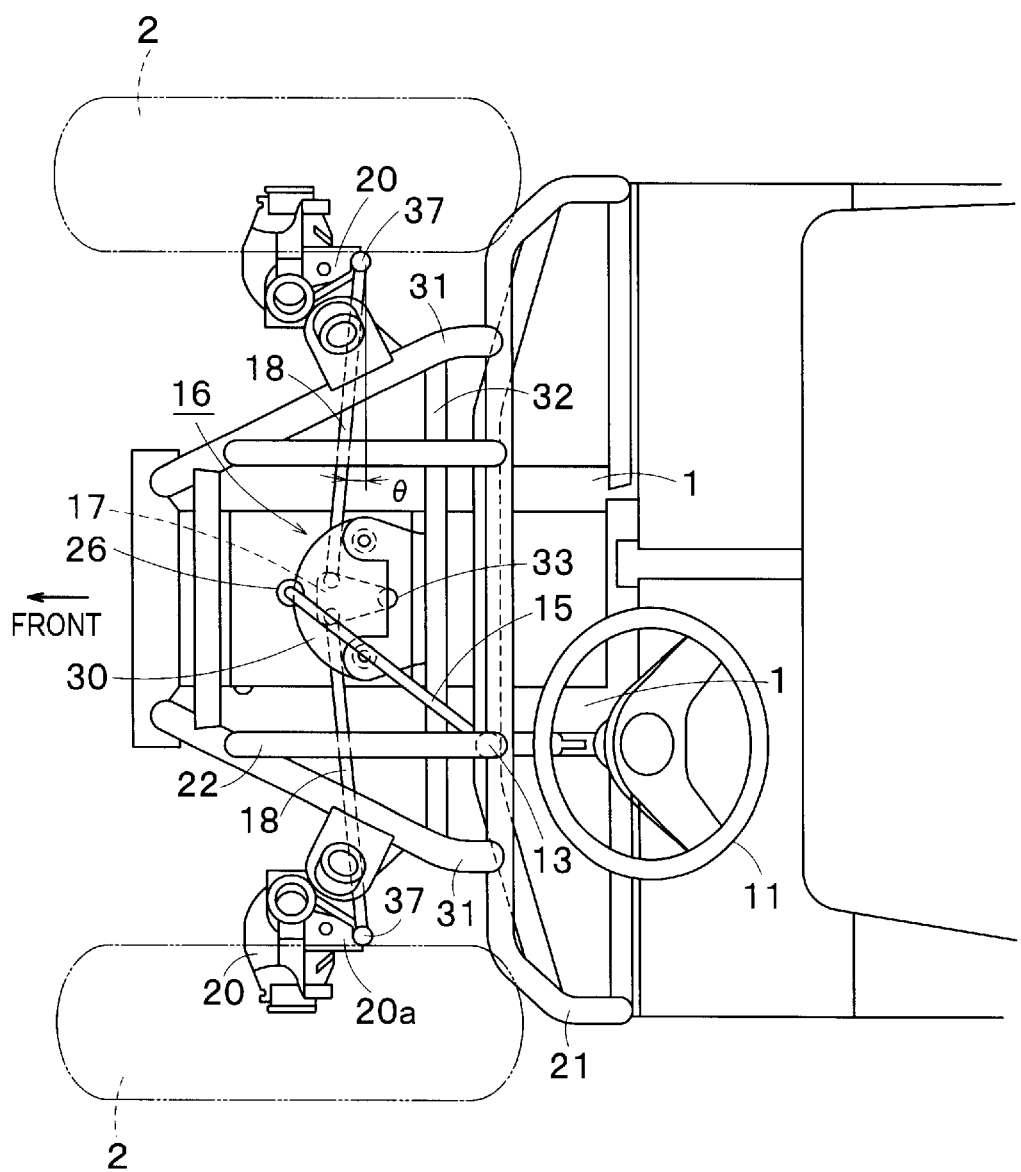
FIG. 3 is a plan view taken along the direction of the arrow III in FIG. 2.

Referring to FIGS. 2 and 3, a steering apparatus is installed in a front region of the passenger spaces. The steering apparatus has an upper steering shaft 14, which is extending obliquely downward from the handle 11, a lower steering shaft 15, which is connected to and extending obliquely downward from the lower end of the upper steering shaft 14, a reduction gear mechanism 16, which has a steering lever 17 and is connected to the lower end of the lower steering shaft 15, right and left tie rods 18, which are joined to the steering lever 17 of the reduction gear mechanism 16, and front knuckles 20, which are joined to the free ends of the tie rods 18, respectively.

The steering shafts 14 and 15 are coupled with each other by a universal joint 13 so that they can bend. The upper steering shaft 14 is supported for rotation in a support pipe 24. The support pipe 24 is held by a bracket 23 on a component pipe 22 of a front frame 21. The lower end portion of the lower steering shaft 15 is connected to a pinion shaft 27, which is included in the reduction gear mechanism 16, by a universal joint 26.

The reduction gear mechanism 16 has a gear case 30 which is disposed in a front region of a foot space S1. The position of the gear case 30 along the back-and-forth direction substantially corresponds to the positions of the knuckles 20. The gear case 30 is fixedly held by a bracket 33 which is attached to a cross pipe 32 of a lower frame 31. An output lever shaft 35 projects downward from a rear portion of the gear case 30. A rear end portion of a steering lever 17 is fixedly connected to the lower end portion of the lever shaft 35. The opposite ends of each tie rod 18 are joined by ball joints 37 to the steering lever 17 and the knuckle 20, respectively.

Referring to FIG. 3, the gear case 30 is disposed at a position substantially corresponding to the middle of the width of the vehicle. The tie rods 18 are extending from the steering lever 17 to the knuckle arms 20a of the right and the left knuckles 20, respectively. The mounting angles θ of the tie rods 18 are very small.

Figure 4:
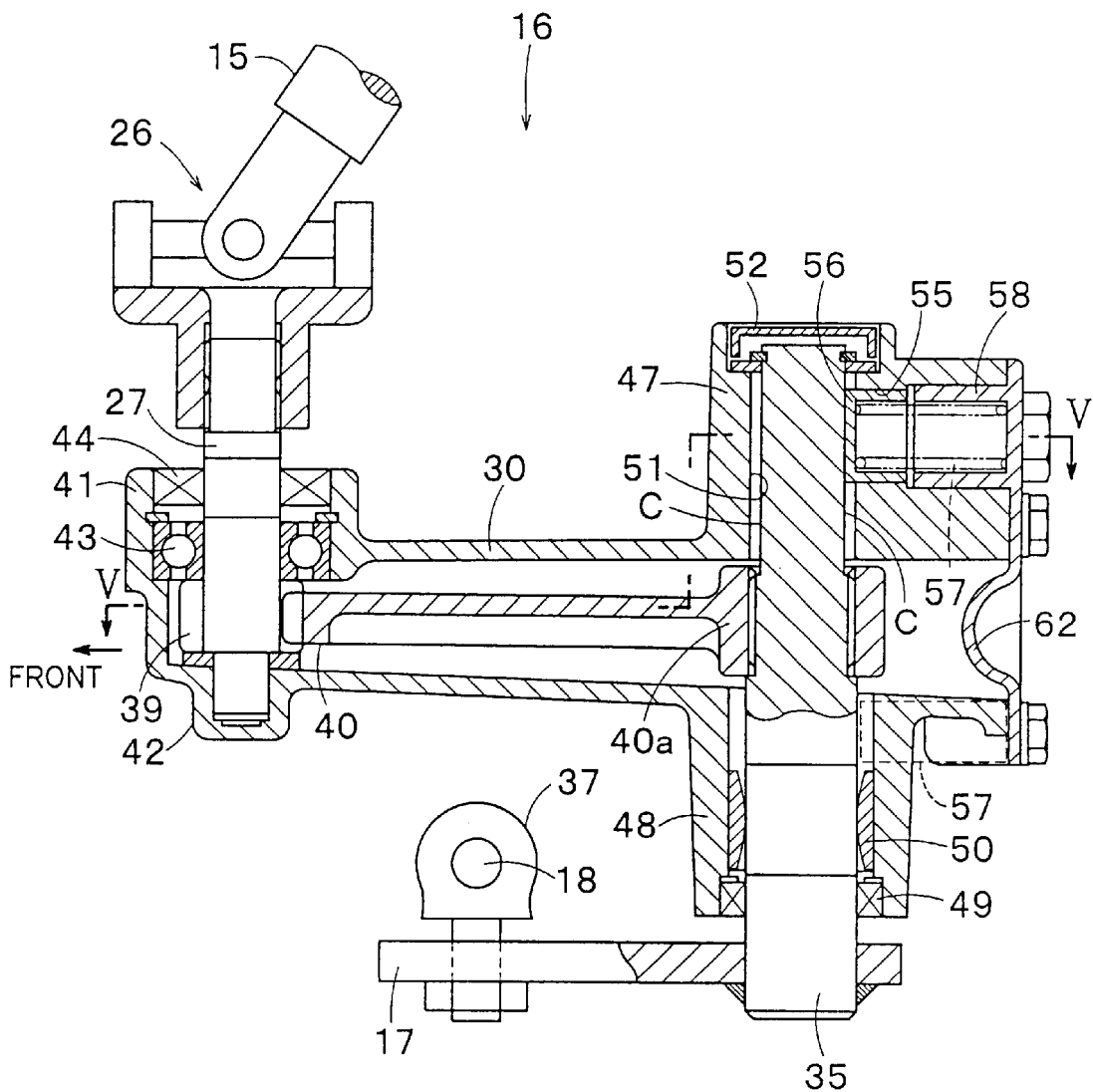
FIG. 4 is a vertical sectional view of a reduction gear mechanism.

Referring to FIG. 4 showing the reduction gear mechanism 16 in a vertical sectional view, a pinion gear 39 is formed integrally with the pinion shaft 27. The pinion gear 39 and a steering gear 40, which is engaged with the pinion gear 39, are housed in the gear case 30. The pinion gear 39 and the steering gear 40 are spur gears having external teeth. The gear case 30 is provided in its front end portion with an upper boss 41 and a bottomed lower boss 42 for supporting the pinion shaft 27. A lower end portion of the pinion shaft 27 is fitted in a bore formed in the lower boss 42, and an upper end portion of the pinion shaft 27 is supported in a ball bearing 43 which is fitted in the upper boss 41. A sealing member 44 is fitted in an upper end portion of the bore of the upper boss 41.

The gear case 30 is provided in its rear end portion with an upper boss 47 and a lower boss 48 for supporting the lever shaft 35. A bearing metal (bushing) 50 is fitted in a bore formed in the lower boss 48 to support a lower portion of the lever shaft 35 so that the lever shaft 35 can rotate. A sealing member 49 is fitted in a lower end portion of the bore of the lower boss 48. A bearing bore 51 is formed in the upper boss 47. An upper portion of the lever shaft 35 is inserted in the bearing bore 51. The open upper end of the bearing bore 51 is covered with a cap 52. A hub 40a formed in a rear portion of the steering gear 40 is put on a middle portion of the lever shaft 35 between the bosses 47 and 48 and is interlocked with the lever shaft 35 by splines. An open rear end of the gear case is covered with a cover 62 which is detachably attached thereto.

Figure 5:
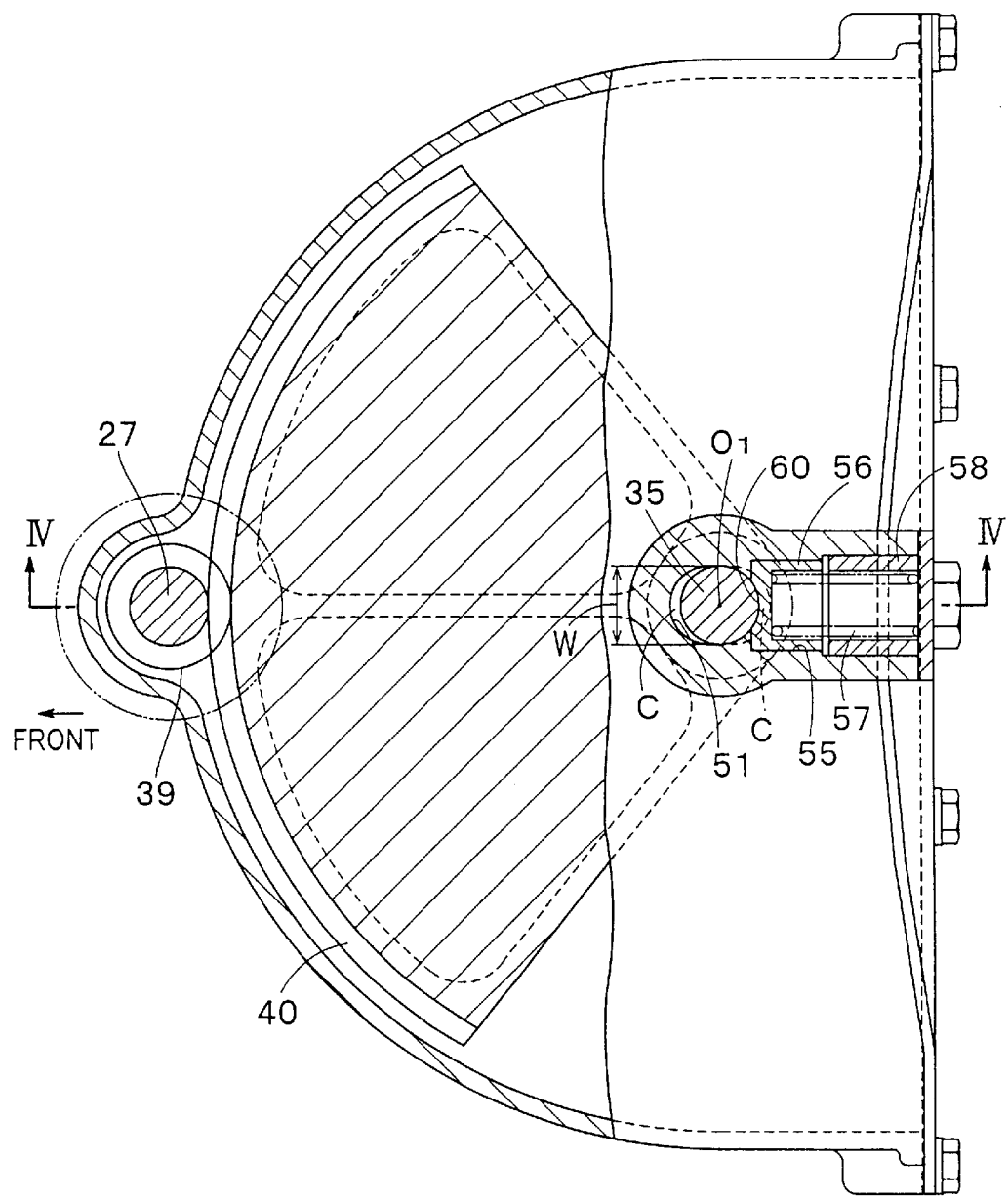
FIG. 5 is a horizontal sectional view taken on line V—V in FIG. 4.

A mechanism for eliminating backlash between the pinion gear 39 and the steering gear 40 will be described hereinafter. As shown in FIG. 5, the bearing bore 51 of the upper boss 47 has a oval shape which has the longer dimension along the back-and-forth direction. The oval shape provides a clearance C along the back-and-forth direction between the circumference of the lever shaft 35 and the side wall of the bearing bore 51 so as to permit the lever shaft 35 to move only in the back-and-forth direction in the bearing bore 51. The clearance C is determined, for example, to permit the upper end of the lever shaft 35 to move in the back-and-forth direction by about 0.5 mm.

A spring housing hole 55 is extending behind the upper boss 47. A plunger 56 having the shape of a bottomed cylinder is axially slidably fitted in the spring housing hole 55. A spring case 58 having the shape of a bottomed cylinder is screwed in the spring housing hole 55 the plunger 56, and a compression coil spring 57 is extending between the front end wall of the plunger 56 and the rear end wall of the spring case 58. The plunger 56 is biased forward by the resilience of the compression coil spring 57 to press the upper portion of the lever shaft 35 forward.

As shown in FIG. 5, a recess 60, which has a partial cylindrical surface corresponding to the shape of the outer circumference of the lever shaft 35, is formed in the front end surface of the plunger 56. The cylindrical surface of the recess 60 is in close contact with a rear surface of the lever shaft 35. The bearing hole 51 is formed in a width W that inhibits the lateral play of the lever shaft 35. The steering gear 40 has a shape substantially resembling a sector which has an axis aligned with the axis O1 of the lever shaft 35.

Figure 6:
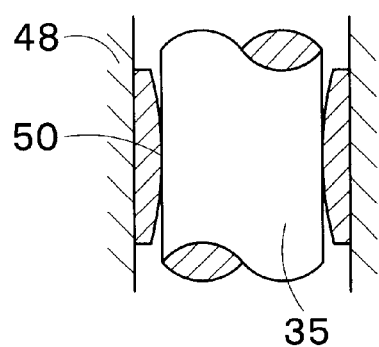
FIG. 6 is a typical, enlarged vertical sectional view of a bearing metal.

Referring to FIG. 6, the bearing metal 50 has a bore defined by a convex inner surface of a large radius of curvature formed by crowning. Therefore, the lever shaft 35 is able to turn on the inner surface of the bearing metal 50 in a small angular range.

In operation, the handle 11 is turned in a desired direction to turn the pinion shaft 27 through the steering shafts 14 and 15. The rotating speed of the pinion shaft 27 is reduced to the rotating speed of the lever shaft 35 by the reduction gear mechanism 16. Consequently, the steering lever 17 is turned through a desired angle to the right or to the left, and the knuckles 20 are turned through the tie rods 18 to turn the front wheels 2 through a desired angle.

The upper portion of the lever shaft 35 is always pressed forward through the plunger 56 by the compression coil spring 57 as shown in FIG. 4. Therefore, the steering gear 40 is always pressed against the pinion gear 39 by a fixed resilience so that backlash between the pinion gear 39 and the steering gear 40 is eliminated. As shown in FIG. 5, the recess 60 is formed in the front end surface of the plunger 56 and the lever shaft 35 is in close contact with the partial cylindrical surface of the recess 60. Therefore, the lever shaft 35 is held stably by the plunger 56 and the plunger 56 is restrained from turning about its axis.

A component force of a reaction force is exerted by the pinion gear 39 through the steering gear 40 on the lever shaft 35. This component force, which is acting in a direction perpendicular to the direction of the biasing force of the compression coil spring 57, is born by the side walls of the bearing hole 51 to prevent the lateral play of the lever shaft 35. Only a component force of the reaction force, which is acting in the back-and-forth direction, is born by the plunger 56.

Figure 7:
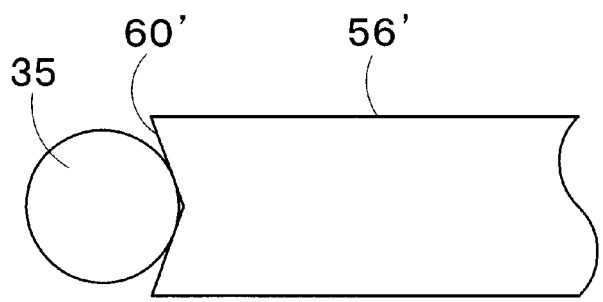
FIG. 7 is a first modification of the plunger of the embodiment.
Figure 8:
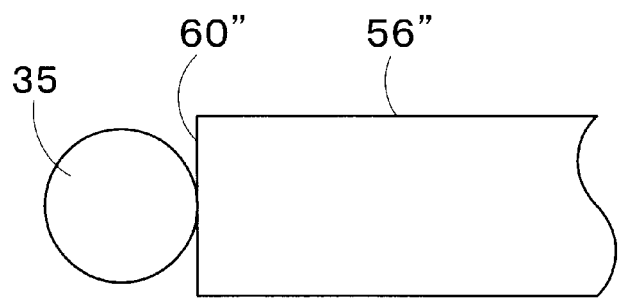
FIG. 8 is a second modification of the plunger of the embodiment.

FIGS. 7 and 8 show modified plungers 56', 56" with a V-shaped groove 60' or a flat surface 60" instead of the recess 60 having the partial cylindrical surface.

Moreover, the plunger 56 may be omitted and the compression coil spring 57 may be directly applied to the lever shaft 35.

The steering apparatus of the present invention is applicable not only to the rear-drive four-wheeled vehicle but also to a front-drive or four-wheel drive vehicle.

A circular bearing bore, which has a diameter slightly greater than that of the lever shaft 35, may be formed in the upper boss 47 instead of the oval bearing bore 51.

The spring 57 for biasing the lever shaft 35 may be disposed on the side of the bearing metal 50 with respect to the position at which the steering gear 40 and the lever shaft 35 are connected. For example, the spring 57 may be disposed at a position corresponding to a position between the hub 40a of the steering gear 40 and the bearing metal 50.

The reduction gear mechanism 16 of a spur gear type has a lateral size smaller than that of the conventional rack-and pinion reduction gear mechanism and hence long tie rods 18 can be used. Therefore, even if the position of the reduction gear mechanism 16 along the back-and-forth direction is distant from that of the knuckles 20, the tie rods 18 can be extending at a small mounting angle and hence steering force will not increase. For example, even if the reduction gear mechanism 16 is disposed at a far front position to provide a large foot space for the driver, the tie rods 18 can be extending at a small mounting angle and the steering apparatus can be lightly operated.

The backlash between the pinion gear 39 and the steering gear 40 is eliminated by applying pressure to the lever shaft 35 to press the steering gear 40 against the pinion gear 39. Therefore, the steering apparatus can be lightly operated. The position of the reduction gear mechanism 16 along the back-and-forth direction can be optionally determined in a wide back-and-forth range. The backlash between the pinion gear 39 and the steering gear 40 can be always eliminated by the simple arrangement and satisfactory steering feeling can be maintained.

Since the steering gear 40, which has a mass greater than that of the pinion gear 39, is biased together with the lever shaft 35 toward the pinion gear 39, the magnitude of rattling of the lever shaft 35 caused by vibrations generated by the engine or the vehicle rattling is lower than that of rattling of the pinion shaft 27 that may be caused when the pinion shaft 27 is pressed in a direction perpendicular to its axis. Since the number of teeth of the steering gear 40 is greater than that of the teeth of the pinion gear 39, the angle of turning of the lever shaft 35 is smaller than that of the pinion shaft 27, the pressing member, i.e., the plunger 56, in contact with the circumference of the lever shaft 35 is not abraded rapidly.

The bearing bore 51 of the upper boss 47 has a oval shape to provide the clearance C along the back-and-forth direction between the circumference of the lever shaft 35 and the side wall of the bearing bore 51. As a result, the lever shaft 35 is permitted to move only in the back-and-forth direction in the bearing bore 51. Therefore, a component force of a reaction force exerted by the pinion gear 39 through the steering gear 40 on the lever shaft 35, which is acting in a direction perpendicular to the direction of the biasing force of the spring 57, is born by the side walls of the bearing hole to prevent the lateral play of the lever shaft 35. The spring 57 is able to exercise its required function without difficulty because the spring 57 needs to bear only a component force of the reaction force acting in a back-and-forth direction.

When the spring 57 is disposed on the side of the bearing hole 51 with respect to the position at which the steering gear 40 and the lever shaft 35 are connected, a force produced by multiplying the force of the spring 57 can be used for pressing the steering gear 40 against the pinion gear 39. Therefore, the spring 57 can be a small one.

Although the invention has been described in its preferred form with a certain degree of particularity, obviously many changes and variations are possible therein. It is therefore to be understood that the present invention may be practiced otherwise than as specifically described herein without departing from the scope and spirit thereof.

What is claimed is:

1. A steering apparatus for a four-wheeled vehicle, comprising:
    a steering shaft adapted to be rotated by a handle;
    a reduction gear mechanism operatively connected to the steering shaft; the reduction gear mechanism including a pinion gear, a steering gear engaged with the pinion gear, a gear case in which the pinion gear and the steering gear are housed, and a pinion shaft on which the pinion gear is mounted, the pinion shaft being connected to the steering shaft,
    a steering lever operatively connected to the reduction gear mechanism,
    right and left tie rods operatively connected to the steering lever;
    right and left knuckles operatively connected to the right and the left tie rods, respectively;
    a lever shaft on which the steering gear is mounted and being combined with the steering lever; and
    a spring biasing the lever shaft so that the steering gear is pressed against the pinion gear.

2. The steering apparatus for a four-wheeled vehicle according to claim 1, wherein the lever shaft has first and second end portions on first and second sides which are located on opposite sides with respect to a position at which the steering gear is connected to the lever shaft, the first end portion being supported by a bearing on the gear case and the second end portion being supported with a radial clearance by a bearing hole formed in the gear case.

3. The steering apparatus for a four-wheeled vehicle according to claim 2, wherein the clearance between the bearing hole and the lever shaft is formed so as to permit the lever shaft to move only in a direction in which the lever shaft is biased by the spring.

4. The steering apparatus for a four-wheeled vehicle according to claim 2, wherein the spring is disposed on the second side on which the bearing hole is formed.

5. The steering apparatus for a four-wheeled vehicle according to claim 4, wherein the spring comprises a compression coil spring and a plunger which is biased forward by the compression coil spring to press the second end portion of the lever shaft forward.

6. The steering apparatus for four-wheeled vehicle according to claim 5, wherein the plunger includes a recess which is in close contact with a rear surface of the lever shaft.

7. The steering apparatus for four-wheeled vehicle according to claim 5, wherein the plunger includes a V-shaped groove which is in contact with a rear surface of the lever shaft.

8. The steering apparatus for four-wheeled vehicle according to claim 5, wherein the plunger includes a flat surface which is in contact with a rear surface of the lever shaft.

9. The steering apparatus for a four-wheeled vehicle according to claim 2, wherein the spring is disposed on the first side on which the bearing is disposed.

10. The steering apparatus for a four-wheeled vehicle according to claim 9, wherein the spring comprises a compression coil spring and a plunger which is biased forward by the compression coil spring to press the second end portion of the lever shaft forward.

11. The steering apparatus for four-wheeled vehicle according to claim 10, wherein the plunger includes a recess which is in close contact with a rear surface of the lever shaft.

12. The steering apparatus for four-wheeled vehicle according to claim 10, wherein the plunger includes a V-shaped groove which is in contact with a rear surface of the lever shaft.

13. The steering apparatus for four-wheeled vehicle according to claim 10, wherein the plunger includes a flat surface which is in contact with a rear surface of the lever shaft.

14. The steering apparatus for a four-wheeled vehicle according to claim 2, wherein the bearing has a convex inner surface on which the lever shaft is supported so that the lever shaft is able to swing back-and-forth.

15. The steering apparatus for a four-wheeled vehicle according to claim 1, wherein the steering gear is a sector gear of which an axis is aligned with an axis of the lever shaft.

16. The steering apparatus for a four-wheeled vehicle according to claim 1, wherein the gear case is provided in its front end portion with an upper boss and a bottomed lower boss for supporting the pinion shaft, a lower end portion of the pinion shaft being fitted in a bore formed in the lower boss, and an upper end portion of the pinion shaft being supported in a ball bearing which is fitted in the upper boss.

* * * * *